United States Patent
Hutter et al.

[11] Patent Number: 5,967,389
[45] Date of Patent: Oct. 19, 1999

[54] SWING-AWAY SPARE TIRE CARRIER

[75] Inventors: Robert B. Hutter, South Lyon; Alexander N. Nassar, Canton, both of Mich.

[73] Assignee: Chrysler Corporation, Auburn Hills, Mich.

[21] Appl. No.: 08/847,265

[22] Filed: May 1, 1997

[51] Int. Cl.$^6$ .................................................. B62D 43/04
[52] U.S. Cl. ................................... 224/42.21; 224/42.12; 224/509; 224/518
[58] Field of Search ............................. 224/42.12, 42.21, 224/488, 495, 502–509, 518–521, 545, 548, 553, 42.23

[56] References Cited

U.S. PATENT DOCUMENTS

| | | | |
|---|---|---|---|
| 2,846,906 | 8/1958 | Kelly | 224/515 |
| 3,343,736 | 9/1967 | Sellers | 224/42.21 |
| 3,398,846 | 8/1968 | Ragan et al. | 224/42.21 |
| 3,883,018 | 5/1975 | Hoisington | 224/42.21 |
| 4,817,834 | 4/1989 | Weiler | 224/42.21 |
| 4,856,686 | 8/1989 | Workentine | 224/521 |
| 4,946,084 | 8/1990 | Britto | 224/42.21 |
| 4,971,237 | 11/1990 | Davis | 224/42.21 |
| 5,358,157 | 10/1994 | Abretske | 224/42.21 |
| 5,538,168 | 7/1996 | Burger et al. | 224/42.21 |
| 5,564,611 | 10/1996 | Weiler | 224/42.21 |

*Primary Examiner*—Gregory M. Vidovich
*Attorney, Agent, or Firm*—Roland A. Fuller, III

[57] ABSTRACT

A swing-away spare tire carrier for a motor vehicle includes a cross tube extending transversely for attachment to underside vehicle structure of the motor vehicle, a single arm support bracket secured solely to the cross tube, the cross tube extending through the arm support bracket, and a carrier arm pivotally attached to the arm support bracket for pivotal movement between a first position adjacent a vehicle body of the motor vehicle and a second position extending substantially laterally from the vehicle body.

15 Claims, 2 Drawing Sheets

SWING-AWAY SPARE TIRE CARRIER

BACKGROUND OF THE INVENTION

1. Field of the Invention

The present invention relates generally to spare tire carriers for motor vehicles and, more particularly, to a swing-away spare tire carrier for a motor vehicle.

2. Description of the Related Art

Motor vehicles typically include a spare tire in the event of a flat or blow-out of one of four tires of the vehicle. The spare tire may be carried interior or exterior to the motor vehicle. For exterior motor vehicle applications, the spare tire is mounted on a spare tire carrier. The spare tire carrier may be stationary or movable. For movable applications, the spare tire carrier has a carrier arm pivotally mounted to a bracket which is fixedly secured to a rear bumper of the motor vehicle by fasteners. The spare tire is mounted by fasteners to the carrier arm which allows the spare tire to "swing-away" from the motor vehicle.

One disadvantage of the above spare tire carrier is that it places a load on the rear bumper of the motor vehicle which is undesired. Another disadvantage of the above spare tire carrier is that it has a relatively large number of parts.

SUMMARY OF THE INVENTION

It is, therefore, one object of the present invention to provide a new and improved swing-away spare tire carrier for a motor vehicle.

It is another object of the present invention to provide a swing-away spare tire carrier that is not attached to a rear bumper of a motor vehicle.

It is yet another object of the present invention to provide a swing-away spare tire carrier for a motor vehicle which has less parts.

To achieve the foregoing objects, the present invention is a swing-away spare tire carrier for a motor vehicle. The swing-away spare tire carrier includes a cross tube extending transversely for attachment to underside vehicle structure of a motor vehicle, preferably of a rear portion of the motor vehicle and, preferably beneath a rear bumper of the motor vehicle, and a single arm support bracket secured solely to the cross tube. The cross tube extends through the arm support bracket. The swing-away spare tire carrier also includes a carrier arm pivotally attached to the arm support bracket for pivotal movement between a first position adjacent a vehicle body of the motor vehicle and a second position extending substantially laterally from the vehicle body.

One advantage of the present invention is that a new and improved swing-away spare tire carrier is provided for a motor vehicle. Another advantage of the present invention is that the swing-away spare tire carrier is attached to vehicle structure similar to a trailer towing hitch and removes all of the load from the rear bumper of the motor vehicle. Yet another advantage of the present invention is that the swing-away spare tire carrier is relatively stronger and less in parts.

Other objects, features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
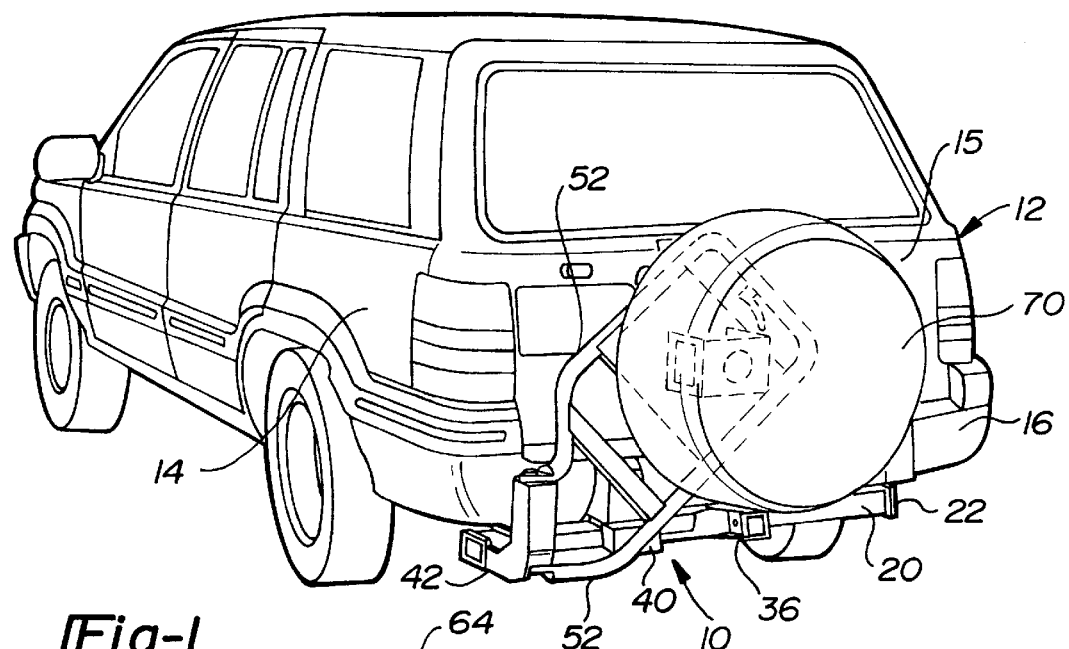
FIG. 1, is a perspective view of a swing-away spare tire carrier, according to the present invention, illustrated in operational relationship with a motor vehicle.
Figure 2:
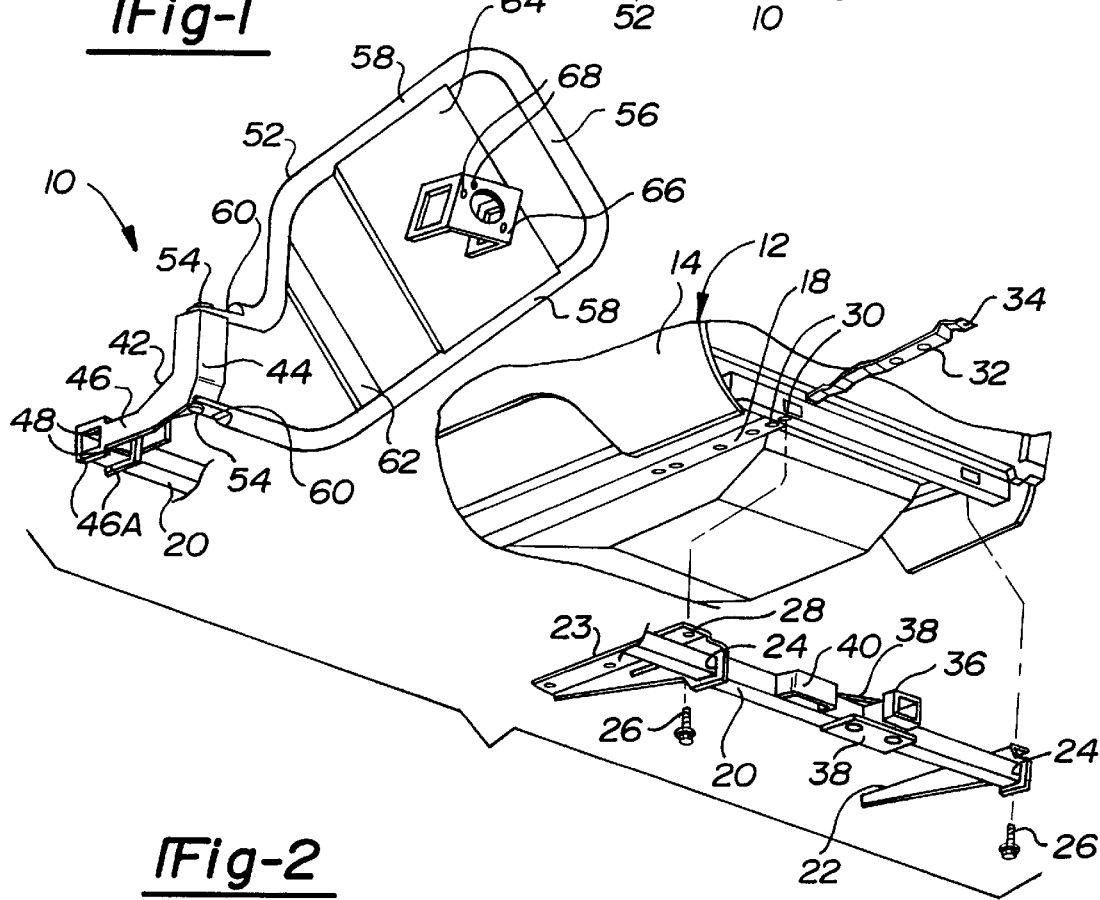
FIG. 2 is an exploded perspective view of a portion of the swing-away spare tire carrier and motor vehicle of FIG. 1.

Referring to FIGS. 1 and 2, a swing-away spare tire carrier 10, according to the present invention, is illustrated in operational relationship with a motor vehicle, generally indicated at 12. The motor vehicle 12 includes a vehicle body 14 having a rear door 15 and a rear bumper 16 mounted thereon as is known in the art. The swing-away spare tire carrier 10 is mounted to underside vehicle structure, such as an underbody or floor pan 18 of the vehicle body 14, preferably of a rear portion of the motor vehicle 12, and preferably below the rear bumper 16. It should be appreciated that the swing-away spare tire carrier 10 is mounted to similar vehicle structure as a conventional trailer towing hitch (not shown) for the motor vehicle 12. The swing-away spare tire carrier 10 includes a cross member or tube 20 extending transversely and a right-hand flange bracket 22 at one end of the cross tube 20 and a left hand flange bracket 23 spaced transversely from the right-hand flange bracket 22 along the cross tube 20. The cross tube 20 is a generally rectangular tube. The flange brackets 22 and 23 have a generally inverted "L" shape and extend longitudinally with an aperture 24 extending transversely therethrough to receive the cross tube 20. The flange brackets 22 and 23 are secured to the cross tube 20 by suitable means such as welding. Each flange bracket 22 and 23 is mounted to the underbody 18 of the vehicle body 14 by suitable means such as fasteners 26. The fasteners 26 extend through apertures 28 in the flange bracket 22 and 23 and apertures 30 in the underbody 18 and threadably engage threaded apertures 32 in a fastening strip 34 disposed within the vehicle body 14. It should be appreciated that the cross tube 20 and flange brackets 22 and 23 are similar to those of the trailer towing hitch and secured to the motor vehicle 12 in a similar manner. It should also be appreciated that a skid plate (not shown) may extend transversely between the flange bracket 22 and 23 and be secured to the vehicle body 14 by the fasteners 26.

The cross tube 20 may include a hitch receiver 36 and receiver support plates 38 attaching a top and bottom of the hitch receiver 36 to the cross tube 20 by suitable means such a welding. The hitch receiver 36 is a generally rectangular tube for receiving a hitch insert (not shown) having a carrier or hitch ball (not shown). The cross tube 20 may also include a hitch bracket 40 secured to the cross tube 20 by suitable means such as welding. It should be appreciated that if the cross tube 20 includes the hitch receiver 36, receiver support plates 38 and hitch bracket 40 that it forms a conventional trailer towing hitch for the motor vehicle 12.

Referring to FIGS. 1 through 5, the swing-away spare tire carrier 10 includes an arm support bracket 42 at the other end of cross tube 20. The arm support bracket 42 has a post portion 44 extending generally vertically and a flange portion 46 extending longitudinally to form a general "L" shape. The post portion 44 has a generally U-shaped cross section with a top wall 47. The flange portion 46 has a pair of flange arms 46a extending longitudinally from the post portion 44 and spaced transversely. Preferably, the post portion 44 and flange portion 46 are integral, unitary and formed as one piece. Each of the flange arms 46 have an aperture 48 extending transversely therethrough to receive the cross tube 20 and is secured to the cross tube 20 by suitable means such as welding. The post portion 44 includes a post 50 extending upwardly and disposed within the post portion 44. The post 50 is preferably a solid rod having a generally circular cross-sectional shape.

The swing-away spare tire carrier 10 also includes a carrier arm 52 pivotally connected by suitable means such as fasteners 54 to the post 50 of the arm support bracket 42. The carrier arm 52 is a tubular member having a generally C-shaped end portion 56 interconnecting a pair of spaced arm portions 58 extending outwardly and generally parallel to each other. The arm portions 58 are bent near their ends such that the carrier arm 52 extends upwardly at an angle from the post 50. The carrier arm 52 includes a distal end 60 at each end of the arm portions 58 which are flattened and have centrally positioned aperture (not shown) extending therethrough. It should be appreciated that the fastener 54 extends through the aperture in the distal end 60 and aperture of the top wall 47 to connect the arm portion 58 to the post 50. It should be also be appreciated that the carrier arm 52 and post 50 rotate together as a unit.

The carrier arm 52 also includes a cross strap 62 extending between the arm portions 58 and attached thereto by suitable means such as welding. The carrier arm 52 includes a tire carrying plate 64 extending between the arm portions 58 and a mounting bracket 66 attached to the tire carrier plate 64 by suitable means such as welding. The mounting bracket 66 has a plurality of fasteners 68 such as threaded bolts attached thereto by suitable means such as welding which are adapted to extend through corresponding apertures (not shown) in a rim (not shown) of a spare tire 70 illustrated in FIG. 1. It should be appreciated that a plurality of nuts (not shown) are threadedly attached to the fasteners 68 to retain the spare tire 70 on the carrier arm 52.

The swing-away spare tire carrier 10 may include a latching mechanism 72 to latch the carrier arm 52 to the rear door 15. The latching mechanism 72 includes a handle 74 pivotally connected to the end portion 56 and opertively connected to a latch (not shown) of the latching mechanism 72. The latch engages and disengages a striker 76 of the latching mechanism 72 which is attached to the rear door 15 by suitable means. It should be appreciated that the latching mechanism 72 and carrier arm 52 are conventional and known in the art.

Figure 3:
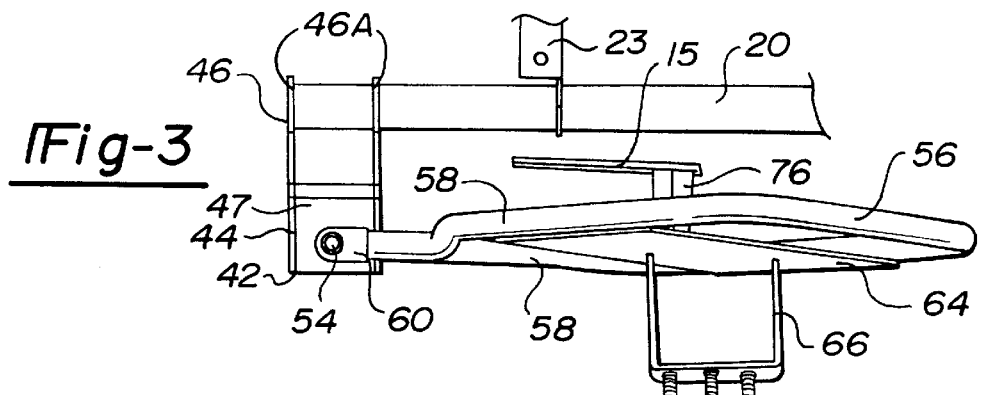
FIG. 3 is a plan view of the swing-away spare tire carrier of FIGS. 1 and 2 illustrated in a first position adjacent a vehicle body of the motor vehicle.
Figure 4:
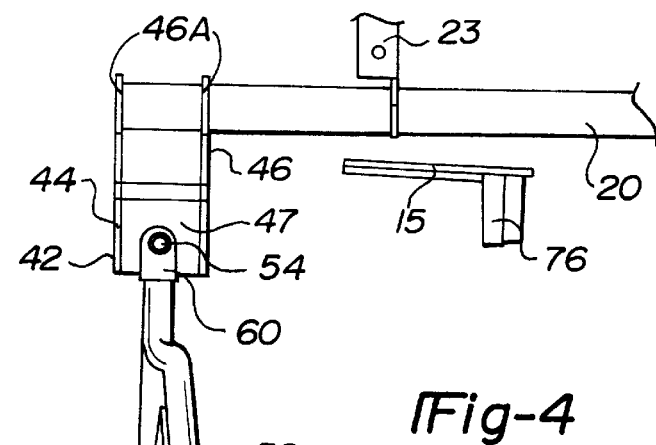
FIG. 4 is a view similar to FIG. 3 illustrating the swing-away spare tire carrier in a second position extending substantially laterally from the vehicle body.
Figure 5:
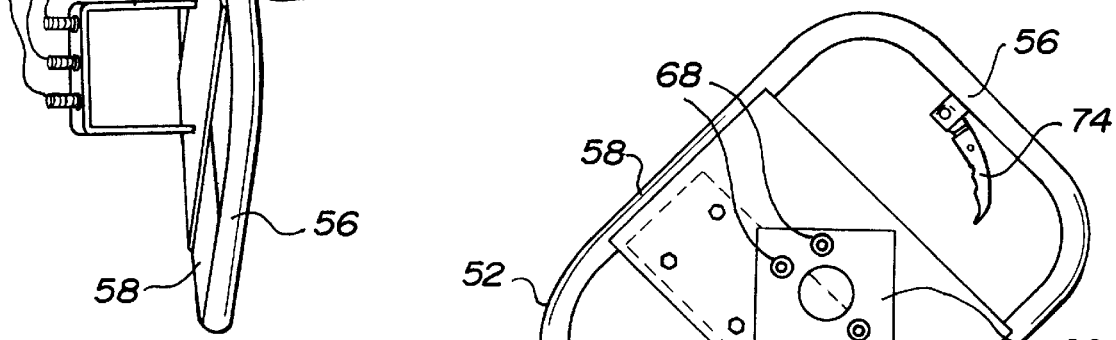
FIG. 5 is an elevational view of the swing-away spare tire carrier of FIGS. 1 and 2.
Figure 5:
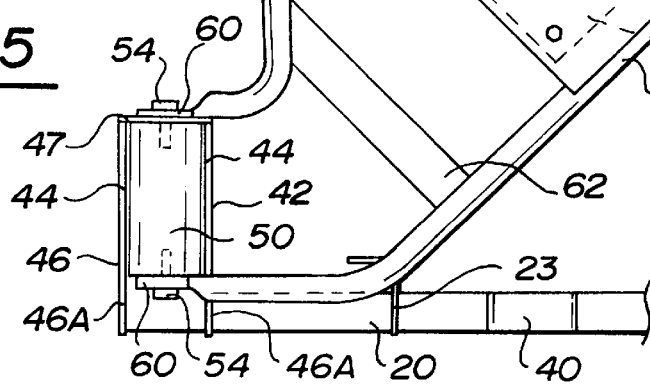

In operation, the spare tire 70 is removably mounted to the carrier arm 52 by the fasteners 68. The carrier arm 52 is arranged for movement between a first position adjacent the vehicle body 14 as illustrated in FIG. 3 and a second position extending laterally from the vehicle body 14 as illustrated in FIG. 4. As a result, the swing-away spare tire carrier 10 can be easily pivoted for opening of the rear door 15 of the motor vehicle 12 or removal of the spare tire 70.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A swing-away spare tire carrier for a motor vehicle comprising:
   a cross tube extending transversely for attachment to underside vehicle structure of a motor vehicle;
   a single arm support bracket having substantially planar flange arms extending longitudinally from said support bracket and spaced transversely from each other with one aperture extending transversely through each of said flange arms, said cross tube extending through said aperture of each of said flange arms and said flange arms being welded to said cross tube; and
   a carrier arm pivotally attached to said arm support bracket for carrying a spare tire and for pivotal movement between a first position adjacent a vehicle body of the motor vehicle and a second position extending substantially laterally from the vehicle body.

2. A swing-away spare tire carrier as set forth in claim 1 wherein said cross tube is adapted to be attached to the underside vehicle structure at a rear portion of the motor vehicle.

3. A swing-away spare tire carrier as set forth in claim 1 wherein said arm support bracket is generally "L" shaped.

4. A swing-away spare tire carrier as set forth in claim 1 wherein said arm support bracket has a first portion extending longitudinally and a second portion extending perpendicularly to said first portion.

5. A swing-away spare tire carrier as set forth in claim 4 wherein said arm support bracket includes a post disposed within and extending parallel to said second portion, wherein said carrier arm is configured for attachment to said post.

6. A swing-away spare tire carrier as set forth in claim 5 including fasteners for securing said carrier arm to said post.

7. A swing-away spare tire carrier as set forth in claim 2 wherein said cross tube includes a hitch receiver attached thereto.

8. A swing-away spare tire carrier as set forth in claim 1 wherein said carrier arm includes a tire carrying plate and mounting bracket attached thereto for removably attaching a spare tire thereto.

9. A swing-away spare tire carrier for a motor vehicle comprising:
   a cross tube extending transversely for attachment to underside vehicle structure of a motor vehicle;
   a single arm support bracket being integral, unitary and formed as one-piece secured solely to said cross tube, said arm support bracket having substantially planar flange arms extending longitudinally from said support bracket and spaced transversely from each other with one aperture extending transversely through each of said flange arms, said cross tube extending through said aperture of each of said flange arms and said flange arms being welded to said cross tube; and
   a carrier arm pivotally attached to said arm support bracket for carrying a spare tire and for pivotal movement between a first position adjacent a vehicle body of the motor vehicle and a second position extending substantially laterally from the vehicle body.

10. A swing-away spare tire carrier as set forth in claim 9 wherein said arm support bracket is generally "L" shaped.

11. A swing-away spare tire carrier as set forth in claim 9 wherein said arm support bracket has a first portion extending longitudinally and a second portion extending perpendicularly to said first portion.

12. A swing-away spare tire carrier as set forth in claim 11 wherein said arm support bracket includes a post disposed within and extending parallel to said second portion, wherein said carrier arm is configured for attachment to said post.

13. A swing-away spare tire carrier as set forth in claim 12 including fasteners for securing said carrier arm to said post.

14. A swing-away spare tire carrier for a motor vehicle comprising:

a cross tube extending transversely for attachment to underside vehicle structure of a motor vehicle and a single "L" shaped arm support bracket having substantially planar flange arms extending longitudinally from said support bracket and spaced transversely from each other with one aperture extending transversely through each of said flange arms, said cross tube extending through said aperture of each of said flange arms and said flange arms being welded to said cross tube;

a carrier arm pivotally attached to said arm support bracket for carrying a spare tire and for pivotal movement between a first position adjacent a vehicle body of the motor vehicle and a second position extending substantially laterally from the vehicle body;

wherein said arm support bracket has a first portion extending longitudinally and including said flange arms and a second portion extending perpendicularly to said first portion and including a post disposed within and extending parallel to said second portion and fasteners for securing said carrier arm to said post.

15. A swing-away spare tire carrier for a motor vehicle comprising:

a cross tube extending transversely for attachment to underside vehicle structure of a motor vehicle;

a single arm support bracket having integral, unitary, substantially planar flange arms formed as one-piece and extending longitudinally from said support bracket and spaced transversely from each other with one aperture extending transversely through each of said flange arms, said cross tube extending through said aperture of each of said flange arms and said flange arms being welded to said cross tube at one point thereof; and a carrier arm pivotally attached to said arm support bracket for carrying a spare tire and for pivotal movement between a first position adjacent a vehicle body of the motor vehicle and a second position extending substantially laterally from the vehicle body.

* * * * *